(No Model.) 2 Sheets—Sheet 1.
C. S. DAME.
COMBINED HAY RAKE AND LOADER.
No. 270,398. Patented Jan. 9, 1883.
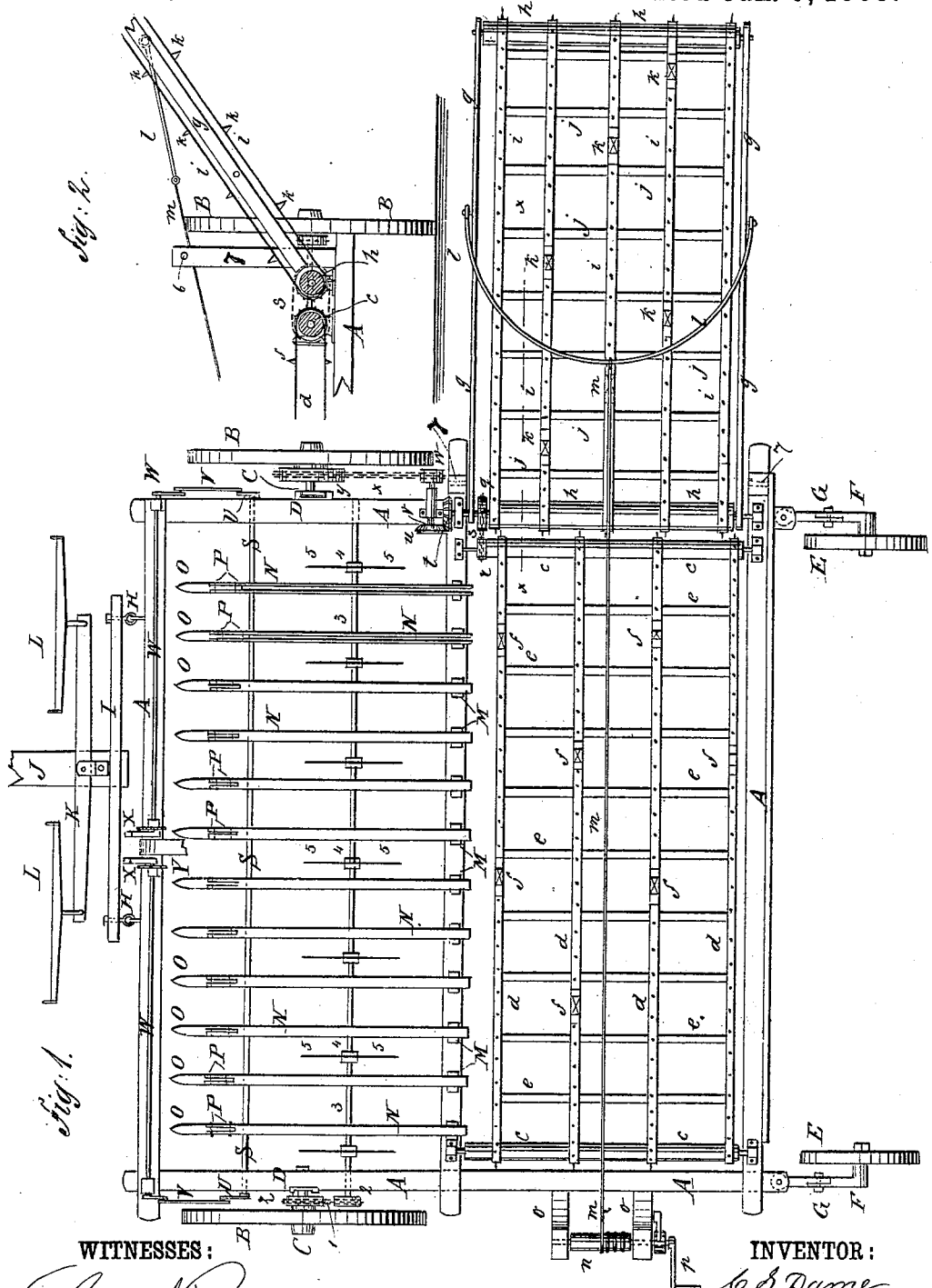
WITNESSES:
Chas. Nida
C. Sedgwick
INVENTOR:
C. S. Dame
BY Munn & Co
ATTORNEYS.

(No Model.) 2 Sheets—Sheet 2.
C. S. DAME.
COMBINED HAY RAKE AND LOADER.
No. 270,398. Patented Jan. 9, 1883.
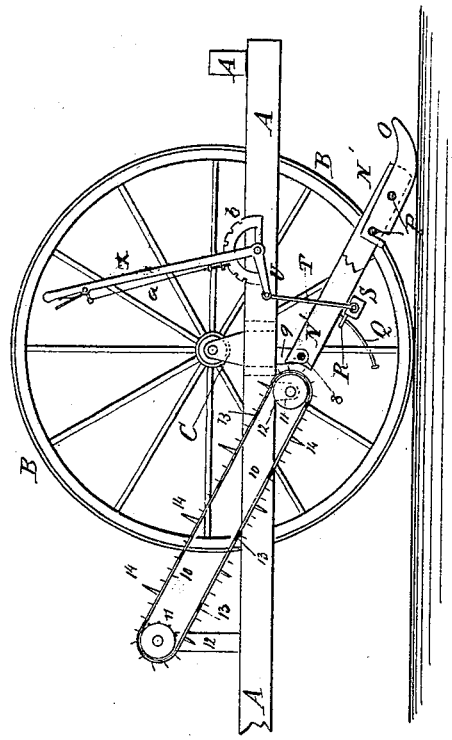

UNITED STATES PATENT OFFICE.

CHARLES S. DAME, OF LANARK, ILLINOIS.

COMBINED HAY RAKE AND LOADER.

SPECIFICATION forming part of Letters Patent No. 270,398, dated January 9, 1883.

Application filed May 9, 1882. (No model.)

*To all whom it may concern:*

Be it known that I, CHARLES STEWART DAME, of Lanark, in the county of Carroll and State of Illinois, have invented a new and useful Improvement in a Combined Hay Rake and Loader, of which the following is a full, clear, and exact description.

Reference is to be had to the accompanying drawings, forming a part of this specification, in which similar letters of reference indicate corresponding parts in all the figures.

Figure 1, Sheet 1, is a plan view of my improvement. Fig. 2, Sheet 1, is a sectional rear elevation of a part of the same, taken through the line $x\ x$, Fig. 1. Fig. 3, Sheet 2, is a side elevation of the improvement, showing the elevator raised. Fig. 4, Sheet 2, is a sectional side elevation of a part of the same, showing a modification.

The object of this invention is to facilitate the raking and loading of hay and grain; and it consists in the peculiar construction and combination of the parts of a combined rake and loader, hereinafter described and set forth.

The forward part of the frame is provided with teeth hinged at their rear ends, and having shoes hinged to their forward ends, the said teeth resting upon a trip-bar suspended from the frame by connecting-rods and bent levers, so that the teeth can be readily raised from the ground. The rear part of the machine is provided with a carrier and an adjustable elevator, driven from the drive-wheel by gear-wheels and chain-wheels and chains, to receive the hay or grain from the teeth and deposit it upon a wagon or in a windrow, the said elevator being provided with a bail, rope or chain, and crank-shaft for regulating its inclination. The machine is also provided with a reel, driven from one of the drive-wheels by a chain and chain-wheels, for forcing the hay or grain up the inclined teeth, as will be hereinafter fully described.

A represents the main frame of the machine, the forward part of which is carried upon the wheels B. The wheels B revolve upon the journals of the crank-axles C, the upright arms of which slide in grooved plates D, attached to the side bars of the frame A, where they are secured in place by bolts or other suitable means, so that the frame A can be adjusted closer to or farther from the ground, as may be required. The rear part of the frame A is supported by the caster-wheels E, which revolve upon the journals of the crank-axles F. The forward ends of the arms of the crank-axles F are hinged to the rear ends of the side bars of the frame A, or to supports attached to the rear corners of the said frame, in such a manner that the said axles can have a horizontal but no vertical play. The arms of the axles F are made with joints G, made rigid by clamping-screws or other suitable means, so that the said axles can be adjusted to raise or lower the rear end of the frame A, as may be required.

To the front bar of the frame A is hinged, by eyebolts H or others suitable means, a draw-bar, I, to the center of which is attached the tongue J, with which the double-tree K and whiffletrees L are connected.

To studs M, attached to the middle cross-bar of the frame A, are hinged the rear ends of the teeth N, by which the hay or grain is collected and raised from the ground. The teeth N can be formed of two bars placed side by side and bolted together, as shown by the right-hand teeth in Fig. 1 or can be made in one piece, as shown by the left-hand teeth in the said figure. The forward end of each tooth N is slotted to receive a tenon formed upon the rear end of the shoe O, which slides upon the ground, is made pointed, and has its lower side curved or beveled, so that it will pass over the ground readily. The tenon of the shoe O is secured to the slotted end of the tooth N by two bolts, P, the lower one of which passes through holes in the said tooth and tenon. The upper bolt P passes through a hole in the tooth N and through a slot in the lower edge of the rear part of the said tenon. With this construction, should the forward end of a shoe, O, strike an obstruction the rear end of the said shoe will rise, raising the forward end of the tooth N and causing the forward end of the shoe to swing back beneath the tooth, so that the said tooth will pass the obstruction without being broken. The shoe O can then be swung forward into working position.

To each tooth N is attached a curved guide-rod, Q, which passes through a guide-hole in a plate or keeper, R, attached to the trip-bar S, so that the teeth will be held from lateral movement while being allowed to move up and down freely, and so that each tooth can rise to pass an obstruction independently of the others.

To each end of the trip-bar S is attached the end of a short connecting-rod, T, the other end of which is pivoted to the lower arm of an angle-lever, U. The angle-levers U are pivoted at their angles to the side bars of the frame A, and with their upper ends are connected, either directly, as shown in Fig. 4, or by means of a connecting-rod, V, and crank-rod W, as shown in Figs. 1 and 3, with the hand-levers X. The latter construction allows the levers X to be placed upon the front bar of the frame A, upon the opposite sides of the standard Y of the driver's seat Z, so that they can be conveniently reached and operated by the driver to adjust the teeth N. With this construction, by operating one of the levers X the teeth N at one side of the machine will be raised, and by operating both of the said levers X all the teeth N will be raised at the same time. Each of the levers X is provided with a lever-pawl, $a$, and a catch-plate, $b$, for holding the said lever securely in any position into which it may be adjusted.

To the end parts of the central and rear crossbars of the frame A are pivoted the ends of two rollers, $c$, around which pass four (more or less) belts, $d$, connected by cross bars or slats $e$, provided with spikes $f$, to form a carrier to receive the hay or grain from the teeth N and carry it to the elevator, hereinafter described.

$g$ is the elevator-frame, to the end parts of which are pivoted two rollers, $h$, around which pass five (more or less) belts, $i$, connected by cross bars or slats $j$, provided with spikes $k$, to adapt the elevator to receive hay or grain from the carrier and deposit it upon a wagon or in a windrow.

To the side bars of the elevator-frame $g$ are pivoted the ends of a bail, $l$, to the center of which is attached the end of a rope or chain, $m$. The other end of the rope or chain $m$ is attached to and wound upon a shaft, $n$, which is journaled in supports $o$, attached to the frame A, and is provided with a crank, $p$, for convenience in operating it. With this construction, by operating the crank $p$ the elevator can raised and lowered to adjust it as the height of the load upon which the hay or grain is to be deposited may require, or to deposit the said hay or grain in a windrow. The elevator can be secured in any position into which it may be adjusted by pins 6, passed through holes in the side bars of the frame $g$, and into holes in the posts 7, attached to the frame A at the opposite sides of the lower end of the elevator-frame $g$.

To the forward ends of the inner-rollers, $c\ h$, are attached chain-wheels $q\ r$, around which passes an endless chain, $s$, so that the carrier will be driven from the elevator.

To the forward journal of the inner-roller $h$ is attached a beveled gear wheel, $t$, the teeth of which mesh into the teeth of a beveled-gear wheel, $u$, attached to the inner end of a short shaft, $v$. The shaft $v$ revolves in bearings attached to the side bar of the frame A, and to its outer end is attached a chain-wheel, $w$, around which passes an endless chain, $x$. The endless chain $x$ also passes around a chain-wheel, $y$, attached to the hub of the drive-wheel B, so that the elevator and carrier will be driven from the said drive-wheel. To the hub of the other drive-wheel B is attached a chain-wheel, $z$, around which passes an endless chain, 1. The chain 1 also passes around a chain-wheel, 2, attached to the end of the shaft 3, which revolves in bearings attached to the side bars of the frame A.

To the shaft 3, between the teeth N, are attached hubs 4, to which are attached teeth or arms 5, which are curved rearward or from their direction of motion, as shown in Fig. 2. The reel 3 4 5 is designed to push the hay or grain up the teeth N, so that it will readily pass upon the carrier. The reel 3 4 5 can be placed below the teeth N, as shown in the drawings, or above the said teeth; or one reel can be placed below and another above the said teeth, as may be desired.

For handling wet grass or hay the teeth N can be replaced by short teeth N', hinged at their upper ends to a rod, 8, which is attached to hangers 9, attached to the frame A. The hay or grain is carried over the space between the upper ends of the teeth N' and the carrier-belts $d$ by the endless belts 10, which pass around rollers 11, journaled in supports 12, attached to the frame A. The belts 10 are connected by cross bars or slats 13, and are provided with spikes 14 in the same manner as the belts $d$ and $i$. The elevator 10 11 is driven from the drive-wheel B by the chain-wheels $z$ 2 and the endless chain 1, as the reel 3 4 5 will not be required when the elevator 10 11 is used.

When the machine is used as a tedder the grass or grain can be allowed to fall to the ground from the rear ends of the teeth N, or from the end of the carrier $c\ d$, or from the end of the elevator $g\ h\ i$, as may be desired.

Having thus described my invention, I claim as new and desire to secure by Letters Patent—

1. The combination, with the frame A, wheels B, axles C, and caster-wheels E, of the teeth N, hung upon the middle cross-bar of frame A, the rolls $c\ c$, journaled on the middle and rear cross-bars, the carrier $d\ e\ f$ on rolls $c$, and the elevator $g\ h\ i\ j\ k$, hinged and journaled at one end upon the middle and rear cross-bars of frame A, as shown and described.

2. The combination, with the frame A and pivoted teeth N, of the trip S, connecting-rods T, elbow-levers U, connecting-rods V, crank-bars W, and hand-levers X, as shown and described.

3. The combination, with the frame A, the carrier $c\ d\ e$, and the elevator $g\ h\ i\ j$, journaled thereon, of the bail $l$, secured to the elevator, the cord or chain $m$, the windlass $p\ n$, journaled to the frame A, and the posts 7, provided with holes and pins 6, as shown and described.

CHARLES STEWART DAME.

Witnesses:
C. W. FRANCK,
JOHN PALEY.